(12) United States Patent
Rennó

(10) Patent No.: US 9,302,777 B2
(45) Date of Patent: Apr. 5, 2016

(54) AIRCRAFT ICING DETECTOR

(71) Applicant: THE REGENTS OF THE UNIVERSITY OF MICHIGAN, Ann Arbor, MI (US)

(72) Inventor: Nilton O. Rennó, Ann Arbor, MI (US)

(73) Assignee: The Regents Of The University Of Michigan, Ann Arbor, MI (US)

( * ) Notice: Subject to any disclaimer, the term of this patent is extended or adjusted under 35 U.S.C. 154(b) by 0 days.

(21) Appl. No.: 14/521,703

(22) Filed: Oct. 23, 2014

(65) Prior Publication Data

US 2015/0115105 A1 Apr. 30, 2015

Related U.S. Application Data

(60) Provisional application No. 61/895,038, filed on Oct. 24, 2013.

(51) Int. Cl.
*G08B 21/00* (2006.01)
*B64D 15/20* (2006.01)

(52) U.S. Cl.
CPC ...................... *B64D 15/20* (2013.01)

(58) Field of Classification Search
None
See application file for complete search history.

(56) References Cited

U.S. PATENT DOCUMENTS

| 4,054,255 | A |   | 10/1977 | Magenheim |   |
|---|---|---|---|---|---|
| 5,005,015 | A | * | 4/1991 | Dehn | G01D 5/62 |
|   |   |   |   |   | 244/134 F |
| 5,301,905 | A | * | 4/1994 | Blaha | B64D 15/20 |
|   |   |   |   |   | 244/134 D |
| 5,313,202 | A | * | 5/1994 | Hansman, Jr. | G08B 19/02 |
|   |   |   |   |   | 244/134 R |
| 5,695,155 | A |   | 12/1997 | Macdonald et al. |   |
| 6,269,320 | B1 |   | 7/2001 | Otto |   |
| 7,104,502 | B2 |   | 9/2006 | Otto et al. |   |
| 7,370,525 | B1 |   | 5/2008 | Zhao et al. |   |
| 2004/0206854 | A1 |   | 10/2004 | Shah et al. |   |
| 2008/0218385 | A1 |   | 9/2008 | Cook et al. |   |
| 2009/0261811 | A1 |   | 10/2009 | Gordon |   |

OTHER PUBLICATIONS

Chang, K., & Hsieh, L. H. (2004), *Microwave Ring Circuits and Related Structures*, Second Edition, John Wiley & Sons, Inc.
Dionigi, M., Ocera, A., Fratticcioli, E., and Sorrentino, R. (2004), A new resonant probe for Dielectric permittivity measurement, *European Micro. Conf. Dig.*, Amsterdam, 673-676.
Fratticcioli, E., M. Dionigi, and R. Sorrentino (2004), "A simple and low-cost measurement system for the complex permittivity characterization of materials," *IEEE Trans. on Instrumentation and Measurement*, 53(4), 1071-1077.

(Continued)

*Primary Examiner* — Travis Hunnings
(74) *Attorney, Agent, or Firm* — Harness, Dickey & Pierce, PLC

(57) ABSTRACT

A system capable of detecting the hazardous accumulation of ice on the surfaces, engines, instruments and air intakes of aircrafts or other objects of interest. The system consists of an electromagnetic microwave resonator capable of detecting the formation of ice directly where it could cause problems. The sensor could be mounted around the air intake of pitot tubes, static ports, engines intake, engines core, and can be embedded in the aircraft skin. The system uses algorithms based on the variations of the complex dielectric permittivity of water substance with frequency to distinguish the various types of ice from each other and from water.

8 Claims, 6 Drawing Sheets

(56) References Cited

OTHER PUBLICATIONS

Kendra, J. R., Ulaby, F. T., & Sarabandi, K. (1994). Snow probe for in situ determination of wetness and density. *Geoscience and Remote Sensing, IEEE Transactions on Geoscience and Remote Sensing*, 32(6), 1152-1159.

Sagnard, F. and Y.-L. Beck (2009), "Experimental study of the influence of moisture and dry density on a silt soil using a monopole probe," *Micro and Optical Tech. Lett.*, 51(3), 820-826.

Sarabandi, K., & Li, E. S. (1997). Microstrip ring resonator for soil moisture measurements. *Geoscience and Remote Sensing, IEEE Transactions on Geoscience and Remote Sensing*, 35 (5), 1223-1231.

International Search Report and Written Opinion, International Application No. PCT/US2014/061949, dated Feb. 9, 2015, 9 pages.

* cited by examiner

AIRCRAFT ICING DETECTOR

CROSS-REFERENCE TO RELATED APPLICATIONS

This application claims the benefit of U.S. Provisional application Ser. No. 61/895,038, filed on Oct. 24, 2013. The entire disclosure of the above application is incorporated herein by reference.

FIELD

The present disclosure relates to a microwave resonator system capable of detecting the hazardous accumulation of ice on the surfaces, engines, air intakes, pitot tubes, static ports and other components of an aircraft.

BACKGROUND AND SUMMARY

This section provides background information related to the present disclosure that is not necessarily prior art. This section further provides a general summary of the disclosure, and is not a comprehensive disclosure of its full scope or all of its features.

Most current aircraft ice detection systems are based on measurements by ice-collecting probes, not placed directly on the areas where ice accumulation can cause problems. For example, U.S. Pat No. 7,104,502 is for a system capable of detecting the accumulation of ice by measuring changes in the vibration frequency of a strut mounted on the nose cone of an aircraft. The strut contains at least one feature that allows ice to accrete on it at higher rate than in other parts of the aircraft. U.S. Pat. No. 7,370,525 refers to a dual channel inflight system that detects ice accretion on a housing containing a light source, mounted on the aircraft surface. The system illuminates the housing with linearly polarized light. Light conductors with polarization sensitivity aligned to the transmitted light and with polarization sensitivity orthogonal to it acquire the backscattered light. The ratio of the intensities of the light in the two conductors is used to detect the presence of ice. The prior art systems described above detect ice on ice-collecting probes and housings, not directly on the places where ice accumulation can cause problems. Thus, they do not detect ice accumulation where it can be a hazard, such as on the air intake of pitot tubes, static ports, engines, wing surfaces and control surfaces.

The aircraft ice detection system of the present teachings comprises an electromagnetic microwave resonator capable of measuring the complex dielectric permittivity of ice accumulated on aircrafts surfaces, air intakes and engines core. In some embodiments, the system contains a multiple frequency microwave resonator, a data processor unit, and interfaces with flight displays and flight systems.

The present teachings provide, in part, a system capable of detecting the hazardous accumulation of ice on the surfaces, engines, instruments and air intakes of an aircraft or other objects of interest. Contrary to the previous art, the present system includes an electromagnetic microwave resonator capable of detecting the formation of ice directly where it could cause problems. The microwave resonator sensor can be mounted around the air intake of pitot tubes, static ports, on engines core, and can be embedded in the aircraft skin. The system uses algorithms based on the variations of the complex dielectric permittivity of water substance with frequency to distinguish the various types of ice from each other and from water. The system uses changes in the microwave resonant frequencies, their quality factors, and the transmitted and possibly received power to detect ice and to measure the ice thickness. The system is capable of determining the type and thickness of ice accumulated in the areas of interest as well as the rate of accumulation. In some embodiments, the system uses a dual frequency microwave resonator to distinguish water and the various types of ice from each other. A warning could be given when ice starts to accumulate. A hazards alert could be given when the thickness of the ice accumulated and/or the rate of accumulation reaches pre-established values regarded to be dangerous.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 4A:
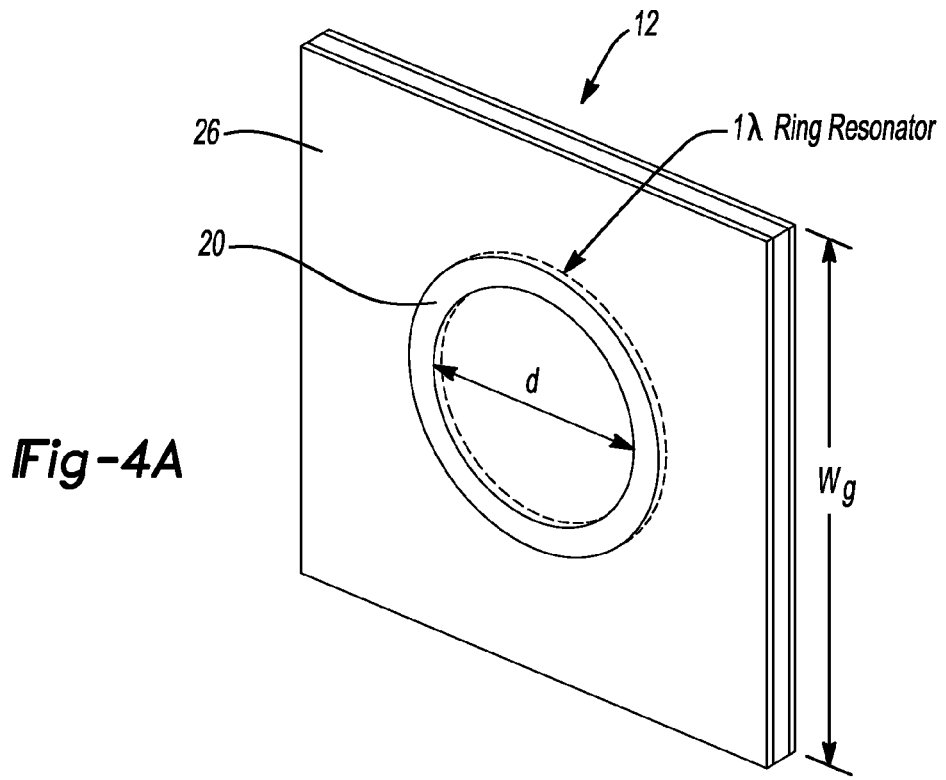
FIG. 4A is a front view illustrating an embodiment of the aircraft icing detector sensor (a microstrip ring resonator) according to the principles of the present teachings.
Figure 4B:
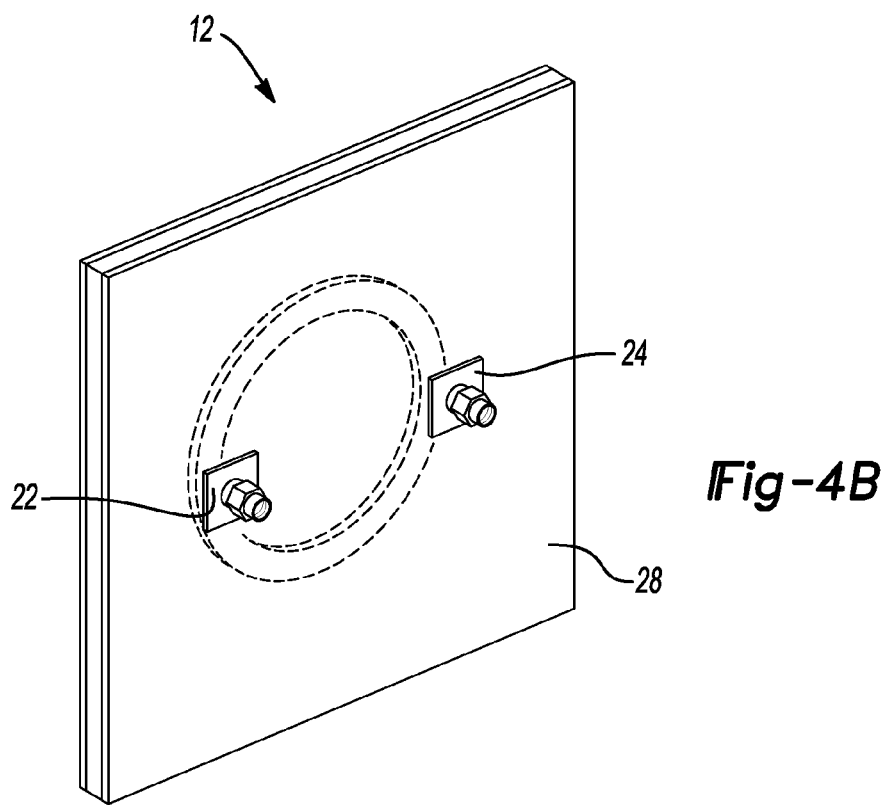
FIG. 4B is a back view illustrating an embodiment of the aircraft icing detector sensor (a microstrip ring resonator) according to the principles of the present teachings.
Figure 4C:
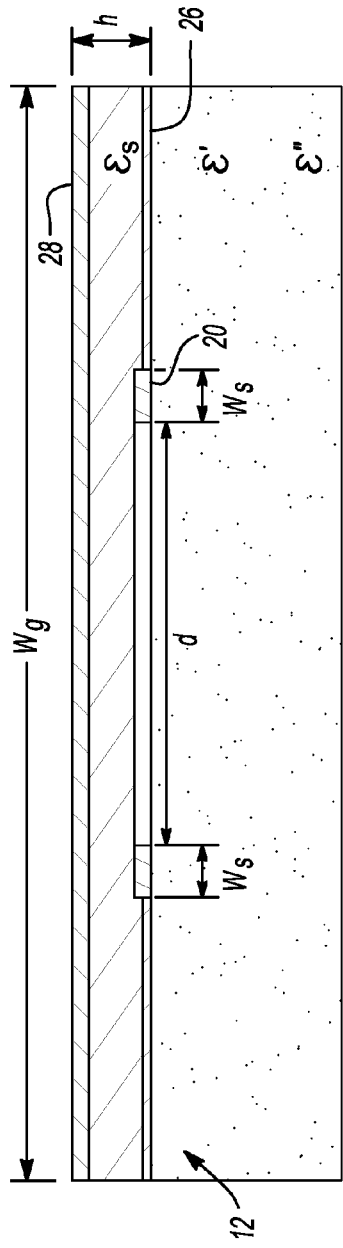
FIG. 4C is a schematic cross-sectional view illustrating an embodiment of the ice detector sensor sensor (a microstrip ring resonator) of the present teachings.
Figure 4D:
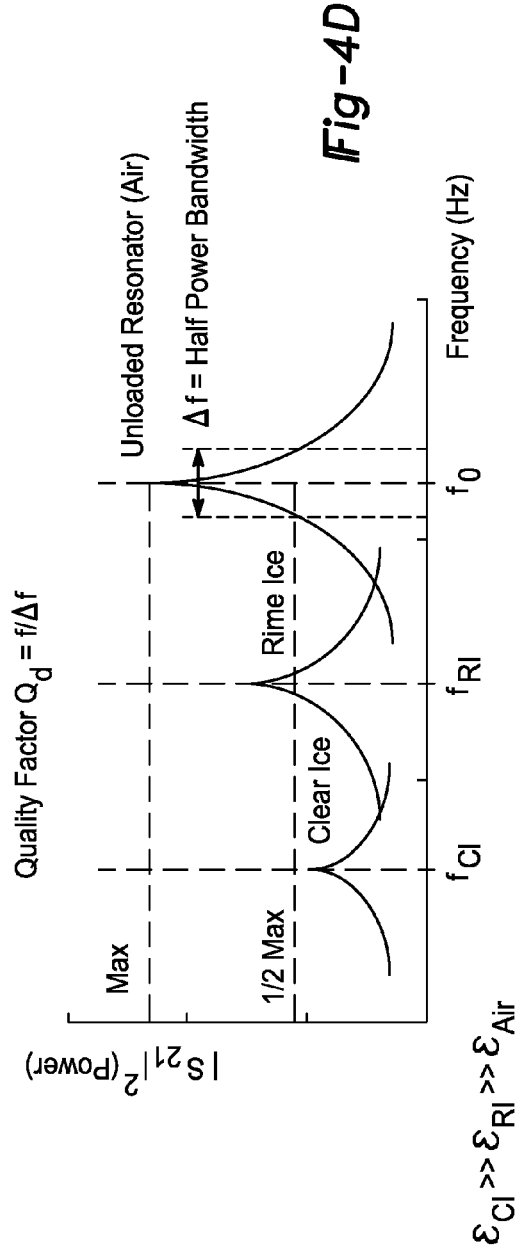

FIG. 4D is a schematic diagram of the distribution of power with frequency for an unloaded resonator (air) and for the resonator loaded with two types of ice (clear and rime). The resonance frequencies ($f_i$) are illustrated for the unloaded (air) and loaded resonator with two types of ice (clear and rime). The quality factor ($Q_d$) is illustrated only for the unloaded (air) resonator. These two parameters ($f_i$ and $Q_d$) are also strongly affected by the ice thickness.

Figure 5:
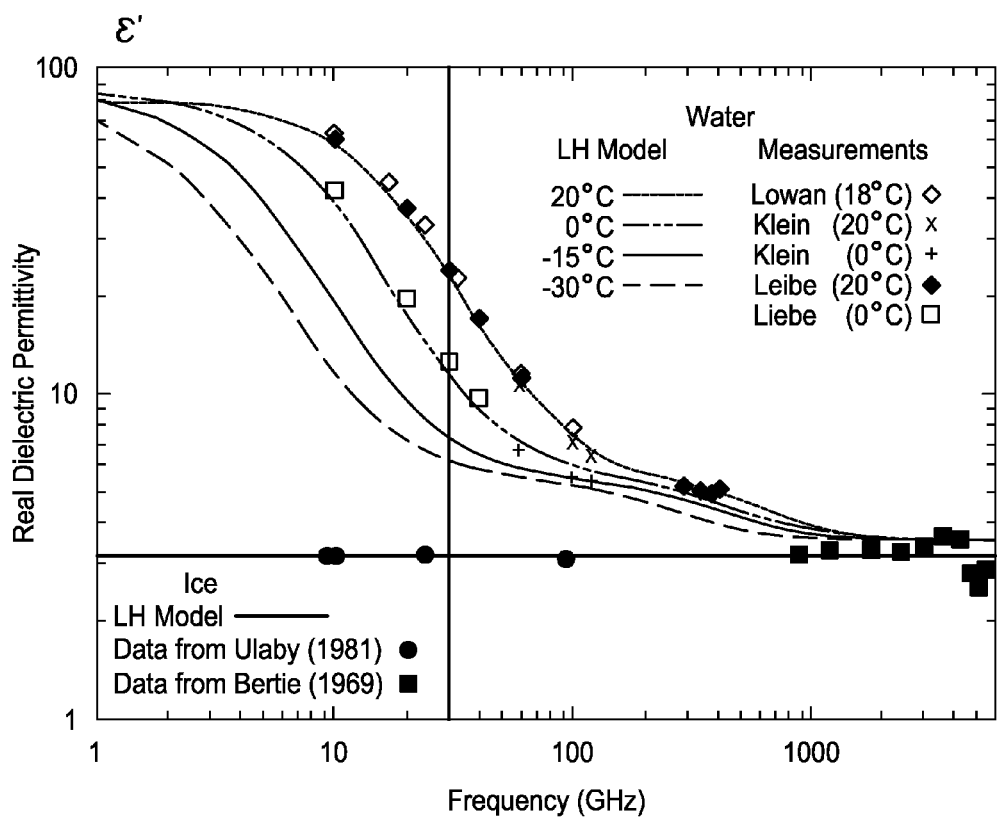

FIG. 5 is a plot showing the real part of the complex dielectric permittivity ($\epsilon'$) of water and one type of ice. For ice $\epsilon'$ is approximately constant with frequency, while for water it is much larger and decreases rapidly with frequency at around 10-100 GHz.

Figure 6A:
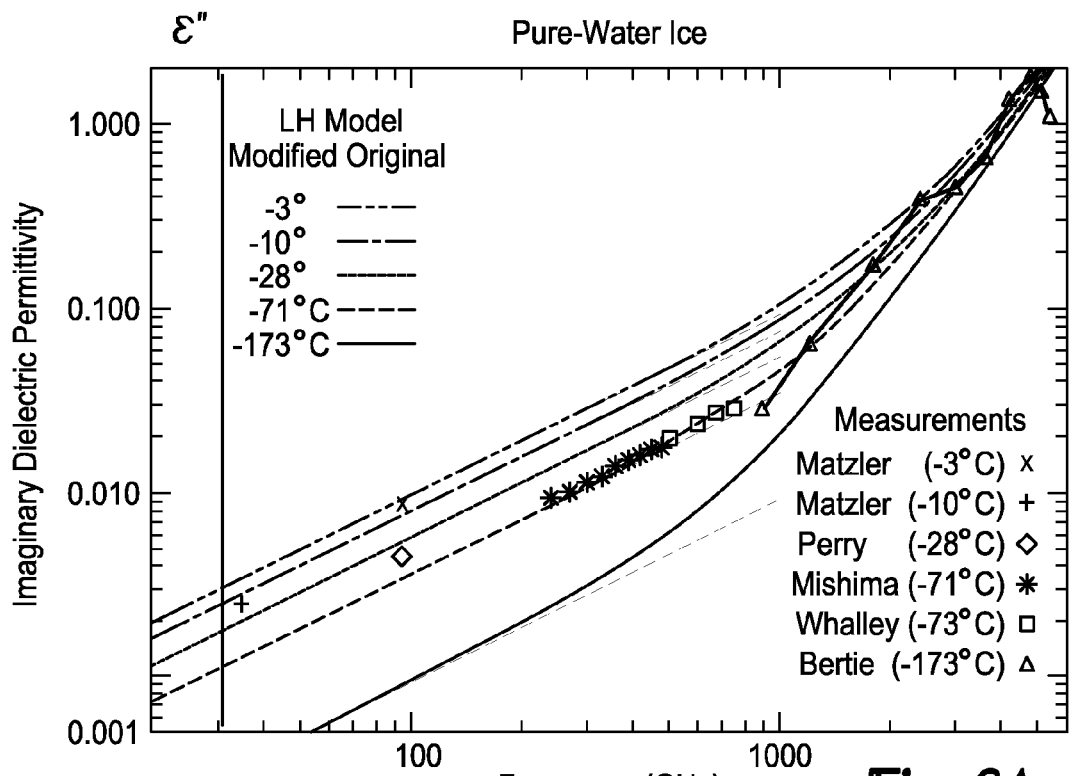
Figure 6B:
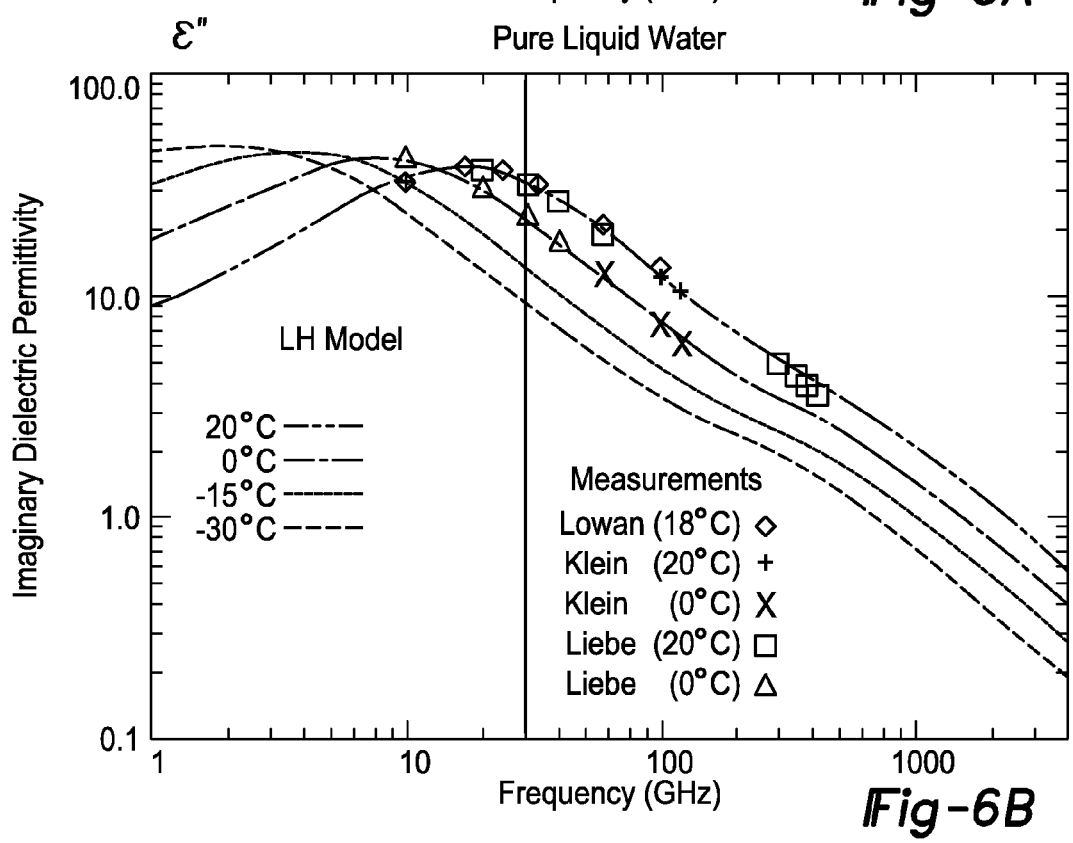

FIGS. 6A and 6B are plots showing the imaginary part of the complex dielectric permittivity ($\epsilon''$) of water and one type of ice. For ice $\epsilon''$ increases with frequency, while for water it is much larger and decreases rapidly with frequency above around 20 GHz.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Figure 1:
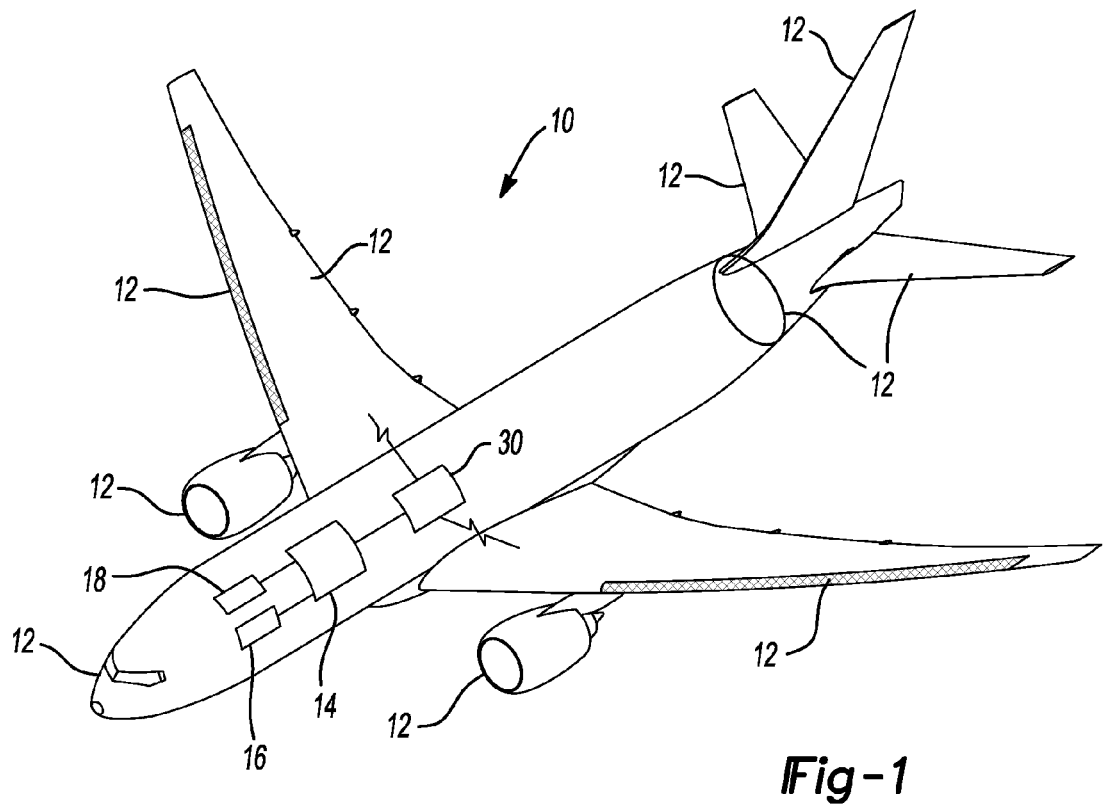
FIG. 1 illustrates the aircraft icing detector system according to the principles of the present teachings, wherein sensors can be placed in critical areas of an aircraft, such as engine inlets, engines core, pitot tubes, elevator skin, wing leading edge and behind ice protected areas where Supercooled Large Droplet Icing (SLD) could cause serious problems.
Figure 2:
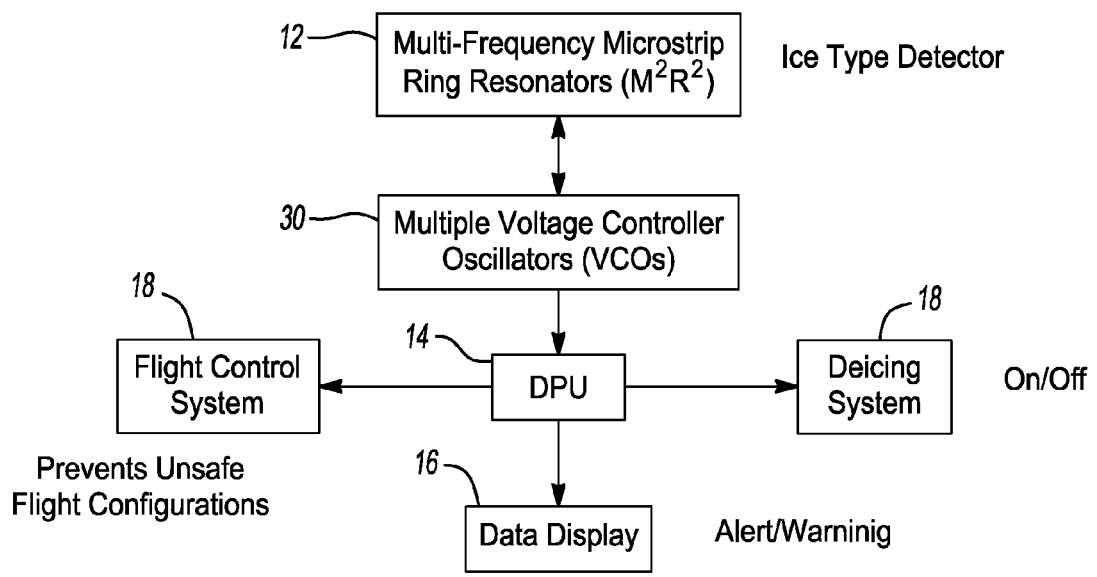
FIG. 2 is a block diagram illustrating an embodiment of the aircraft icing detector system.
Figure 3:
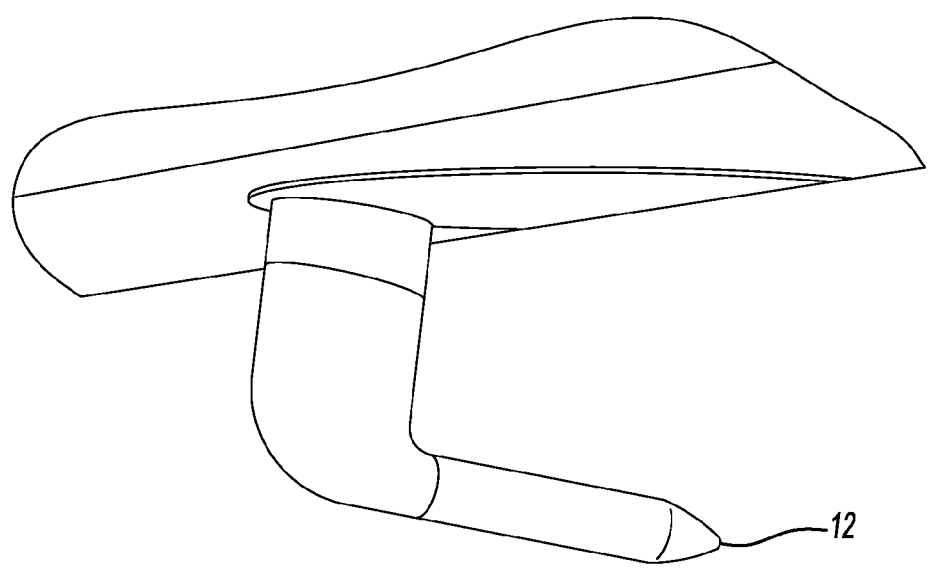
FIG. 3 illustrates an embodiment of the aircraft icing detector sensor (a hollow microstrip ring resonator) being incorporated into a pitot tube of an aircraft.
Figure 3:
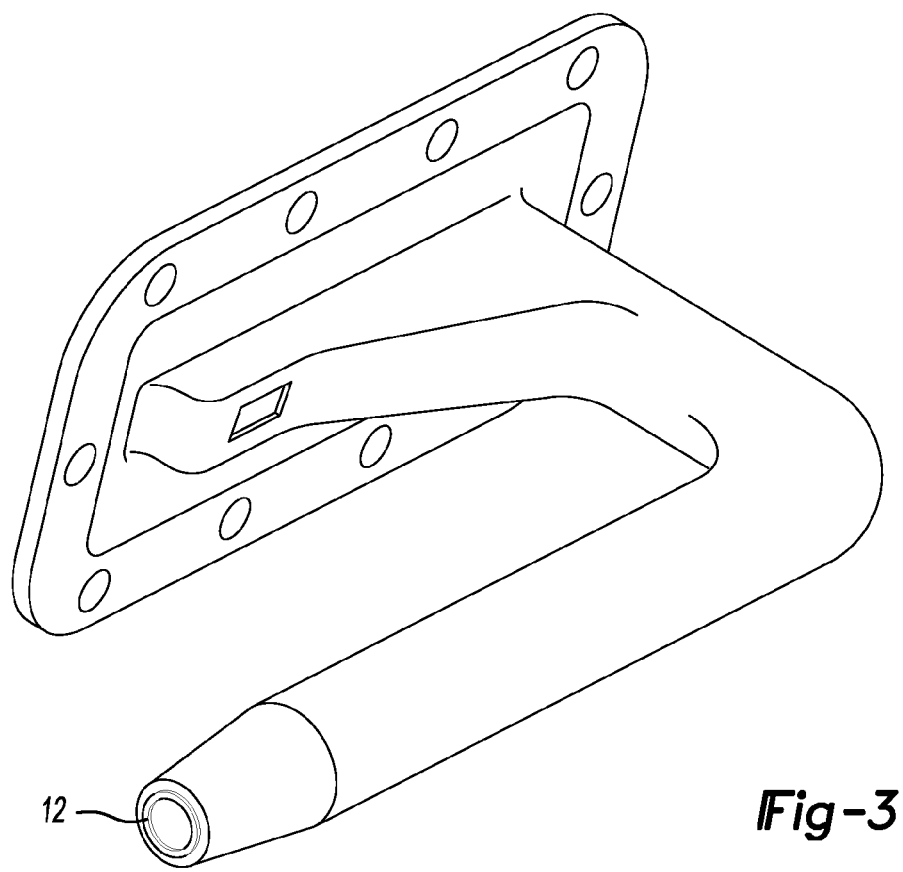

According to the principles of the present teachings, as illustrated in FIG. 1, an aircraft icing detector system 10 is provided for detecting ice formation on aircrafts and other objects of interest. In some embodiments, aircraft icing detector system 10 for detecting ice accumulation, the rate of accumulation, the type of ice and the thickness of the ice layer. In some embodiments, aircraft icing detector system 10 can include an ice detector sensor 12, such as an electromagnetic microwave resonator. In some embodiments, ice detector sensor 12 can be positioned directly at locations that are susceptible to ice formation, critical to flight safety, and/or other areas of interest. By way of non-limiting example, such locations can include the leading edge of wings and other flight surfaces, engines intake areas, engines core, windscreens or other aircraft portals, airspeed measurement systems (such as pitot tubes, static ports, and the like), and other areas where ice accumulation information is desired. Generally, aircraft icing detector system 10 uses variations in the complex dielectric permittivity of water substance (see FIGS. 5, 6A, 6B) to detect icing and the type of icing on the areas of interest.

In some embodiments, aircraft icing detector system 10 further includes a data processing unit 14 having a central processing unit to receive information from ice detector sensor 12 and determine the complex dielectric permittivity of the detected substance to determine the type of substance as discussed herein. In some embodiments, controller or data processing unit (DPU) 14 can output a control signal that can be routed to a display device 16 to alert a pilot or other user. Additionally, in some embodiments, data processing unit 14 can output a control signal that can be routed to an aircraft control system 18 for activating deicing or anti-icing equipment, output warning or alarms to a user, or activate mediation options.

In some embodiments, as illustrated in FIG. 4, ice detector sensor 12 can comprise a microstrip ring resonator 20 having an input SMA 22 and an output SMA 24. Resonator 20 can be disposed on an exterior surface 26 of an aircraft 28 or other surface of interest. Input SMA 22 and output SMA 24 can serve as electrical connection points to receive the signal from a signal-generation circuit and to transmit the signal from ice detector sensor 12 to the data processing unit 14. In some embodiments, input SMA 22 and output SMA 24 are disposed on an interior surface 28, opposite exterior surface 26. As illustrated in FIG. 4C, ice detector sensor 12 can comprise a layered structure having a ground plate 50, a microstrip ring resonator 20, and a substrate 52 disposed therebetween. Ring resonator 20 can define a diameter d and a width of the resonator ring being $w_s$. Ring resonator 20 is where material to be probed or sensed 100 (e.g., ice) will be deposited.

In some embodiments, aircraft icing detector system 10 further includes a voltage-controlled oscillator (VCO) 30 used to generate a swept frequency signal (FIG. 4D) at each frequency band desired. Control and power supply circuits and digital frequency counters are used to verify the VCO output frequency, wherein said control and power supply circuits and digital frequency counters can be integral with voltage-controlled oscillator 30 or may be incorporated in ice detector sensor 12 and/or data processing unit 14. Voltage-controlled oscillator 30 outputs a VCO signal that can be amplified and split into two signals. One signal path can feed ice detector sensor 12, and the other signal can feed a reference. The reference allows the instrument to be calibrated for drifts of the voltage-controlled oscillator 30, detectors, and amplifiers caused by aging and variations of temperature. This allows accurate measurements of the peak resonant frequency ($f_i$) and the half-power bandwidth necessary for calculating the quality factor of the resonance ($Q_d$).

In operation, aircraft icing detector system 10 uses changes in the resonant frequency and the quality factor of the oscillator ($Q_d$) to detect ice and estimate its type and thickness. The fraction of the power transmitted ($S_{21}$ is a function of $\epsilon'$, $\epsilon''$ and the thickness of the layer of water or ice) and the fraction reflected ($S_{11}$) by electromagnetic resonators coupled to a transmission line (FIG. 4) depends mostly on the real part of complex dielectric permittivity ($\epsilon'$) and the thickness of the material in the vicinity of the resonator 20, in the case of this invention ice accumulated on the surface of the resonator. Thus, measurement of $S_{21}$ is sufficient for the implementation of the technique (FIG. 4D).

In some embodiments, aircraft icing detector system 10 uses multi-frequency resonators similar to the resonator described in FIGS. 4A, 4B, 4C and 4D and the algorithm described herein to detect various types of ice and their thickness.

The algorithm for detecting the type and the thickness of the ice comprises the following steps (not all sequentially):

1. Measure the power of the transmitted signal ($S_{21}$) as a function of frequency;
2. Determine one more resonance frequencies ($f_i$) and their quality factors ($Q_d$);

3. Use analytical expressions or lookup tables to determine the real part of the complex dielectric permittivity ($\epsilon'$) at each resonance frequency, and the thickness of the layer of water or ice, based on the value of the transmitted power ($S_{21}$), resonance frequencies ($f_i$) and their quality factors ($Q_d$);

4. Use analytical expressions or lookup tables to determine the imaginary part of the complex dielectric permittivity ($\epsilon''$) at each frequency, and the thickness of the layer of water or ice, based on the value of the power of the transmitted signal ($S_{21}$), resonance frequencies ($f_i$) and their quality factors ($Q_d$); and 5. Use analytical expressions or lookup tables based on data similar to that shown in FIGS. 5, 6A, and 6B to refine the calculations and confirm or refute the presence of water or ice.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for detecting ice formation on aircrafts comprising:
    an electromagnetic resonator operating at microwave frequencies; and
    a data processing unit with non-transitory software implementing an algorithm to detect at least one of the presence of ice, ice type and ice thickness and output at least one of a warning and an alert, the algorithm including:
        a) measuring resonance frequencies ($f_i$) and associated quality factors ($Q_d$) using distribution of power of a transmitted signal ($S_{21}$) of said electromagnetic resonator;
        b) determining power of a transmitted signal associated with said reasonance frequencies;
        c) using analytical expressions or lookup tables to determine a real part of a complex dielectric permittivity ($\epsilon'$) at each of said resonance frequencies based on said resonance frequencies ($f_i$), associated quality factors ($Q_d$), and distribution of power of said transmitted signal ($S_{21}$);
        d) using analytical expressions or lookup tables to determine an imaginary part of said complex dielectric permittivity ($\epsilon''$) at each of said resonance frequencies and a thickness of a layer of water or ice based on said resonance frequencies ($f_i$), associated quality factors ($Q_d$), and distribution of power of said transmitted signal ($S_{21}$); and
        e) using analytical expressions or lookup tables to refine the calculations and confirm or refute the presence of water or ice.

2. The system according to claim 1 wherein said measuring a distribution of power of said transmitted signal associated with said reasonable frequencies further comprises measuring a power of a reflected signal.

3. The system according to claim 2 wherein said using analytical expressions or lookup tables to determine said real part of a complex dielectric permittivity ($\epsilon'$) at each of said resonance frequencies based on said distribution of power of said transmitted signal ($S_{21}$) further comprises using analytical expressions or lookup tables to determine a real part of a complex dielectric permittivity ($\epsilon'$) at each of said resonance frequencies based on said distribution of power of said reflected signals ($S_{11}$).

4. The system according to claim 2 wherein said using analytical expressions or lookup tables to determine an imaginary part of said complex dielectric permittivity ($\epsilon''$) at each of said resonance frequencies and a thickness of a layer of water or ice based on said distribution of power of said transmitted signal ($S_{21}$) further comprises using analytical expressions or lookup tables to determine an imaginary part of said complex dielectric permittivity ($\epsilon''$) at each of said resonance frequencies and a thickness of a layer of water or ice based on said distribution of power of said reflected signals ($S_{11}$).

5. The system according to claim 1, further comprising:
    an interface for outputting the at least one warning and alert to a flight display of the aircraft.

6. The system according to claim 1, further comprising:
    an interface for actuating a deicing system of the aircraft in response to the at least one warning and alert.

7. The system according to claim 1, further comprising:
    an interface system operably receiving the at least one warning and alert, said interface system preventing unsafe flight configurations of the aircraft in response to the at least one warning and alert.

8. A method for detecting ice formation and its type on an area of interest, said method comprising:
    measuring one or more resonance frequencies ($f_i$) and their associated amplitude ($|S_{21}|^2$);
    measuring a quality factor ($Q_d$) of said one or more resonance frequencies ($f_i$) based on a half-power (3 dB) amplitude;
    using said one or more resonance frequencies, said quality factors, and analytical expressions or look-up tables to determine the real part of a complex dielectric permittivity ($\epsilon'$) at said one or more resonance frequencies;
    using said one or more resonance frequencies, said quality factors, and analytical expressions or look-up tables to determine the imaginary part of a complex dielectric permittivity ($\epsilon''$) at each frequency;
    if said complex dielectric permittivity ($\epsilon'$, $\epsilon''$) at said one or more resonance frequencies is within a predetermined range then determining the type of ice and estimating a thickness of the ice;
    if a temporal rate of change of said complex dielectric permittivity ($\epsilon'$, $\epsilon''$) at said one or more resonance frequencies is within said predetermined range then estimating a rate of accumulation of the ice on the area of interest.

* * * * *